(12) United States Patent
Sherlock et al.

(10) Patent No.: US 10,664,369 B2
(45) Date of Patent: May 26, 2020

(54) DETERMINE FAILED COMPONENTS IN FAULT-TOLERANT MEMORY

(71) Applicant: HEWLETT PACKARD ENTERPRISE DEVELOPMENT LP, Houston, TX (US)

(72) Inventors: Derek Alan Sherlock, Fort Collins, CO (US); Harvey Ray, Fort Collins, CO (US); Michael Kontz, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/500,063

(22) PCT Filed: Jan. 30, 2015

(86) PCT No.: PCT/US2015/013921
§ 371 (c)(1),
(2) Date: Jan. 30, 2017

(87) PCT Pub. No.: WO2016/122642
PCT Pub. Date: Aug. 4, 2016

(65) Prior Publication Data
US 2017/0242769 A1    Aug. 24, 2017

(51) Int. Cl.
*G06F 11/20* (2006.01)
*G06F 11/07* (2006.01)
*G06F 11/10* (2006.01)

(52) U.S. Cl.
CPC ...... *G06F 11/2092* (2013.01); *G06F 11/0727* (2013.01); *G06F 11/0751* (2013.01);
(Continued)

(58) Field of Classification Search
CPC .............................. G06F 11/20; G06F 11/2092
(Continued)

(56) References Cited

U.S. PATENT DOCUMENTS 5,032,744 A    7/1991  Wai Yeung Liu
5,243,592 A    9/1993  Perlman et al.
(Continued)

FOREIGN PATENT DOCUMENTS

CN    101576805 A    11/2009
CN    102521058 A    6/2012
(Continued)

OTHER PUBLICATIONS

International Search Report and Written Opinion; PCT/US2015/013921; dated Oct. 8, 2015; 12 pages.
(Continued)

*Primary Examiner* — Kamini B Patel
(74) *Attorney, Agent, or Firm* — Hewlett Packard Enterprise Patent Department

(57) ABSTRACT

According to an example, a failed component in a fault-tolerant memory fabric may be determined by transmitting request packets along a plurality of routes between the redundancy controller and a media controller in periodic cycles. The redundancy controller may determine whether route failures for all of the plurality of routes have occurred within a number of consecutive periodic cycles. In response to determining that route failures for all of the plurality of routes have occurred within a number of consecutive periodic cycles, the media controller is established as failed. In response to determining that route failures for less than all of the plurality of routes have occurred within the number of consecutive periodic cycles, a fabric device is established as failed.

15 Claims, 8 Drawing Sheets

(52) U.S. Cl.
CPC .... *G06F 11/1084* (2013.01); *G06F 2201/805* (2013.01); *G06F 2201/82* (2013.01); *G06F 2211/1009* (2013.01)

(58) Field of Classification Search
USPC ......................................................... 714/6.2
See application file for complete search history.

(56) References Cited

U.S. PATENT DOCUMENTS

| | | | |
|---|---|---|---|
| 5,327,553 A * | 7/1994 | Jewett | G06F 1/12 714/3 |
| 5,533,999 A | 7/1996 | Hood et al. | |
| 5,546,535 A | 8/1996 | Stallmo et al. | |
| 5,555,266 A | 9/1996 | Buchholz et al. | |
| 5,633,996 A | 5/1997 | Hayashi et al. | |
| 5,633,999 A | 5/1997 | Clowes et al. | |
| 5,724,046 A | 3/1998 | Martin et al. | |
| 5,905,871 A * | 5/1999 | Buskens | H04L 12/185 709/238 |
| 6,073,218 A | 6/2000 | Dekoning et al. | |
| 6,081,907 A | 6/2000 | Witty et al. | |
| 6,092,191 A | 7/2000 | Shimbo et al. | |
| 6,141,324 A | 10/2000 | Abbott et al. | |
| 6,151,659 A | 11/2000 | Solomon et al. | |
| 6,181,704 B1 | 1/2001 | Drottar et al. | |
| 6,389,373 B1 | 5/2002 | Ohya | |
| 6,457,098 B1 | 9/2002 | Dekoning et al. | |
| 6,467,024 B1 | 10/2002 | Bish et al. | |
| 6,490,659 B1 | 12/2002 | McKean et al. | |
| 6,502,165 B1 | 12/2002 | Kishi et al. | |
| 6,510,500 B2 | 1/2003 | Sarkar | |
| 6,542,960 B1 | 4/2003 | Wong et al. | |
| 6,654,830 B1 | 11/2003 | Taylor et al. | |
| 6,735,645 B1 | 5/2004 | Weber et al. | |
| 6,826,247 B1 | 11/2004 | Elliott et al. | |
| 6,834,326 B1 | 12/2004 | Wang et al. | |
| 6,911,864 B2 | 6/2005 | Bakker et al. | |
| 6,938,091 B2 | 8/2005 | Das Sharma | |
| 6,970,987 B1 | 11/2005 | Ji et al. | |
| 7,366,808 B2 | 4/2008 | Kano et al. | |
| 7,506,368 B1 | 3/2009 | Kersey et al. | |
| 7,738,540 B2 | 6/2010 | Yamasaki et al. | |
| 7,839,858 B2 | 11/2010 | Wiemann et al. | |
| 7,908,513 B2 | 3/2011 | Ogasawara et al. | |
| 7,934,055 B2 | 4/2011 | Flynn et al. | |
| 7,996,608 B1 | 8/2011 | Chatterjee et al. | |
| 8,005,051 B2 | 8/2011 | Watanabe | |
| 8,018,890 B2 | 9/2011 | Venkatachalam et al. | |
| 8,054,789 B2 | 11/2011 | Boariu et al. | |
| 8,103,869 B2 | 1/2012 | Balandin et al. | |
| 8,135,906 B2 | 3/2012 | Wright et al. | |
| 8,161,236 B1 | 4/2012 | Noveck et al. | |
| 8,169,908 B1 | 5/2012 | Sluiter et al. | |
| 8,171,227 B1 | 5/2012 | Goldschmidt et al. | |
| 8,332,704 B2 | 12/2012 | Chang et al. | |
| 8,341,459 B2 | 12/2012 | Kaushik et al. | |
| 8,386,834 B1 | 2/2013 | Goel et al. | |
| 8,386,838 B1 | 2/2013 | Byan | |
| 8,462,690 B2 | 6/2013 | Chang et al. | |
| 8,483,116 B2 | 7/2013 | Chang et al. | |
| 8,605,643 B2 | 12/2013 | Chang et al. | |
| 8,619,606 B2 | 12/2013 | Nagaraja | |
| 8,621,147 B2 | 12/2013 | Galloway et al. | |
| 8,667,322 B1 | 3/2014 | Chatterjee et al. | |
| 8,700,570 B1 | 4/2014 | Marathe et al. | |
| 8,793,449 B1 | 7/2014 | Kimmel | |
| 8,812,901 B2 | 8/2014 | Sheffield | |
| 9,128,948 B1 | 9/2015 | Raorane | |
| 9,166,541 B2 | 10/2015 | Funato et al. | |
| 9,298,549 B2 | 3/2016 | Camp et al. | |
| 9,621,934 B2 | 4/2017 | Seastrom et al. | |
| 2001/0002480 A1 | 5/2001 | Dekoning et al. | |
| 2002/0162076 A1 | 10/2002 | Talagala et al. | |
| 2003/0037071 A1 | 2/2003 | Harris et al. | |
| 2003/0126315 A1 | 7/2003 | Tan et al. | |
| 2004/0133573 A1 | 7/2004 | Miloushev et al. | |
| 2004/0233078 A1 | 11/2004 | Takehara | |
| 2005/0027951 A1 | 2/2005 | Piccirillo et al. | |
| 2005/0044162 A1 | 2/2005 | Liang et al. | |
| 2005/0120267 A1 | 6/2005 | Burton et al. | |
| 2005/0144406 A1 | 6/2005 | Chong, Jr. | |
| 2005/0157697 A1 * | 7/2005 | Lee | H04L 45/128 370/349 |
| 2006/0112304 A1 | 5/2006 | Subramanian et al. | |
| 2006/0129559 A1 | 6/2006 | Sankaran et al. | |
| 2006/0264202 A1 | 11/2006 | Hagmeier et al. | |
| 2007/0028041 A1 | 2/2007 | Hallyal et al. | |
| 2007/0140692 A1 * | 6/2007 | DeCusatis | H04J 14/02 398/57 |
| 2007/0168693 A1 | 7/2007 | Pittman | |
| 2007/0174657 A1 | 7/2007 | Ahmadian et al. | |
| 2008/0060055 A1 | 3/2008 | Lau | |
| 2008/0137669 A1 | 6/2008 | Balandina et al. | |
| 2008/0201616 A1 | 8/2008 | Ashmore | |
| 2008/0281876 A1 | 11/2008 | Mimatsu | |
| 2009/0080432 A1 | 3/2009 | Kolakeri et al. | |
| 2009/0259882 A1 | 10/2009 | Shellhamer | |
| 2009/0313313 A1 | 12/2009 | Yokokawa et al. | |
| 2010/0107003 A1 | 4/2010 | Kawaguchi | |
| 2010/0114889 A1 | 5/2010 | Rabii et al. | |
| 2011/0109348 A1 | 5/2011 | Chen et al. | |
| 2011/0173350 A1 | 7/2011 | Coronado et al. | |
| 2011/0208994 A1 | 8/2011 | Chambliss et al. | |
| 2011/0213928 A1 | 9/2011 | Grube et al. | |
| 2011/0246819 A1 | 10/2011 | Callaway et al. | |
| 2011/0314218 A1 | 12/2011 | Bert | |
| 2012/0032718 A1 | 2/2012 | Chan et al. | |
| 2012/0059800 A1 | 3/2012 | Guo | |
| 2012/0096329 A1 | 4/2012 | Taranta et al. | |
| 2012/0137098 A1 | 5/2012 | Wang et al. | |
| 2012/0166699 A1 | 6/2012 | Kumar et al. | |
| 2012/0166909 A1 | 6/2012 | Schmisseur et al. | |
| 2012/0201289 A1 | 8/2012 | Abdalla et al. | |
| 2012/0204032 A1 | 8/2012 | Wilkins et al. | |
| 2012/0213055 A1 | 8/2012 | Bajpai et al. | |
| 2012/0297272 A1 | 11/2012 | Bakke et al. | |
| 2012/0311255 A1 | 12/2012 | Chambliss et al. | |
| 2013/0060948 A1 | 3/2013 | Ulrich et al. | |
| 2013/0128721 A1 | 5/2013 | Decusatis et al. | |
| 2013/0128884 A1 | 5/2013 | Decusatis et al. | |
| 2013/0138759 A1 * | 5/2013 | Chen | G06F 11/141 709/212 |
| 2013/0148702 A1 | 6/2013 | Payne | |
| 2013/0227216 A1 | 8/2013 | Cheng et al. | |
| 2013/0246597 A1 | 9/2013 | Iizawa et al. | |
| 2013/0297976 A1 | 11/2013 | McMillen | |
| 2013/0311822 A1 | 11/2013 | Kotzur et al. | |
| 2013/0312082 A1 | 11/2013 | Izu et al. | |
| 2014/0067984 A1 | 3/2014 | Danilak | |
| 2014/0095865 A1 | 4/2014 | Yerra et al. | |
| 2014/0115232 A1 | 4/2014 | Goss et al. | |
| 2014/0136799 A1 | 5/2014 | Fortin | |
| 2014/0269731 A1 | 9/2014 | Decusatis et al. | |
| 2014/0281688 A1 | 9/2014 | Tiwari et al. | |
| 2014/0304469 A1 * | 10/2014 | Wu | G06F 3/065 711/114 |
| 2014/0331297 A1 | 11/2014 | Innes et al. | |
| 2015/0012699 A1 | 1/2015 | Rizzo et al. | |
| 2015/0095596 A1 | 4/2015 | Yang et al. | |
| 2015/0146614 A1 | 5/2015 | Yu et al. | |
| 2015/0199244 A1 | 7/2015 | Venkatachalam et al. | |
| 2015/0288752 A1 | 10/2015 | Voigt | |
| 2016/0034186 A1 | 2/2016 | Weiner et al. | |
| 2016/0170833 A1 | 6/2016 | Segura et al. | |
| 2016/0196182 A1 | 7/2016 | Camp et al. | |
| 2016/0226508 A1 | 8/2016 | Kurooka et al. | |
| 2017/0253269 A1 | 9/2017 | Kanekawa et al. | |

(56) References Cited

U.S. PATENT DOCUMENTS

2017/0302409 A1* 10/2017 Sherlock .......... H04L 1/06
2017/0346742 A1* 11/2017 Shahar .......... H04L 47/18

FOREIGN PATENT DOCUMENTS

| CN | 104333358 A | 2/2015 |
|---|---|---|
| EP | 1347369 B1 | 11/2012 |
| IN | 1546/MUM/2013 | 3/2015 |
| TW | 201346530 A | 11/2013 |
| WO | 02/91689 A1 | 11/2002 |
| WO | WO-2014120136 A1 | 8/2014 |

OTHER PUBLICATIONS

Li, M. et al.; Toward I/O-Efficient Protection Against Silent Data Corruptions in RAID Arrays, (Research Paper); Jun. 2-6, 2014; 12 Pages.

Xingyuan, T. et al., "An Offset Cancellation Technique in a Switched-Capacitor Comparator for SAR ADCs"; (Research Paper), „Journal of Semiconductors 33.1. „Jan. 2012, 5 pages, http://www.jos.ac.cn/bdtxbcn/ch/reader/create_pdf.aspx?file_no=11072501.

Razavi, B. et al., "Design Techniques for High-Speed, High-Resolution Comparators," (Research Paper). IEEE Journal of Solid-State Circuits 27.12, Dec. 12, 1992, pp. 1916-1926, http://www.seas.ucla.edu/brweb/papers/Journals/R%26WDec92_2.pdf.

Mao, Y. et al., A New Parity-based Migration Method to Expand Raid-5, (Research Paper), Nov. 4, 2013, 11 Pages.

Kimura et al., "A 28 Gb/s 560 mW Multi-Standard SerDes With Single-Stage Analog Front-End and 14-Tap Decision Feedback Equalizer in 28 nm CMOS," IEEE Journal of Solid-State Circuits, vol. 49, No. 12, Dec. 2014, pp. 3091-3103.

Kang, Y. et al., "Fault-Tolerant Flow Control in On-Chip Networks," (Research Paper), Proceedings for IEEE, May 3-6, 2010, 8 pages, available at http://citeseerx.ist.psu.edu/viewdoc/download?doi=10.1.1.228.7865&rep=rep1&type=pdf.

International Search Report and Written Opinion received for PCT Patent Application No. PCT/US2015/013898, dated Oct. 8, 2015, 9 pages.

International Search Report and Written Opinion received for PCT Patent Application No. PCT/US2015/013817, dated Oct. 29, 2015, 11 pages.

International Search Report and Written Opinion received for PCT Patent Application No. PCT/US2014/062196, dated Jun. 30, 2015, 13 pages.

International Search Report and Written Opinion received for PCT Patent Application No. PCT/US2014/053704, dated May 15, 2015, 11 pages.

International Preliminary Report on Patentability received for PCT Patent Application No. PCT/US2015/013921, dated Aug. 10, 2017, 9 pages.

International Preliminary Report on Patentability received for PCT Patent Application No. PCT/US2015/013898, dated Aug. 10, 2017, 8 pages.

International Preliminary Report on Patentability received for PCT Patent Application No. PCT/US2015/013817, dated Aug. 10, 2017, 9 pages.

International Preliminary Report on Patentability received for PCT Patent Application No. PCT/US2014/062196, dated May 4, 2017, 12 pages.

International Preliminary Report on Patentability received for PCT Patent Application No. PCT/US2014/053704, dated Mar. 16, 2017, 10 pages.

Amiri, K. et al., Highly Concurrent Shared Storage, (Research Paper), Sep. 7, 1999, 25 Pages.

Almeida, P. S., et al; Scalable Eventually Consistent Counters Over Unreliable Networks; Jul. 12, 2013; 32 Pages.

International Searching Authority, The International Search Report and the Written Opinion, dated Feb. 26, 2015, 10 Pages.

International Search Report and Written Opinion received for PCT Patent Application No. PCT/US2015/023708, dated Apr. 22, 2016, 11 pages.

International Search Report and Written Opinion received for PCT Patent Application No. PCT/US2014/049193, dated Feb. 26, 2015, 8 pages.

International Preliminary Report on Patentability received for PCT Patent Application No. PCT/US2015/023708, dated Oct. 12, 2017, 10 pages.

International Preliminary Report on Patentability received for PCT Patent Application No. PCT/US2014/049193, dated Feb. 9, 2017, 7 pages.

EMC2; High Availability and Data Protection with EMC Isilon Scale-out NAS, (Research Paper); Nov. 2013; 36 Pages.

Do I need a second RAID controller for fault-tolerance ?, (Research Paper); Aug. 22, 2010; 2 Pages; http://serverfault.com/questions/303869/do-i-need-a-second-raid-controller-for-fault-tolerance.

* cited by examiner

DETERMINE FAILED COMPONENTS IN FAULT-TOLERANT MEMORY

BACKGROUND

Current data storage devices such as volatile and nonvolatile memory often include a fault tolerance mechanism to ensure that data remains available in the event of a device error or failure. An example of a fault tolerance mechanism provided to current data storage devices is a redundant array of independent disks (RAID). RAID is a storage technology that controls multiple memory modules and provides fault tolerance by storing data with redundancy. RAID technology may store data with redundancy in a variety of ways. Examples of redundant data storage include duplicating data and storing the data in multiple memory modules and adding parity to store calculated error recovery bits. The multiple memory modules, which may include the data and associated parity, may be accessed concurrently by multiple redundancy controllers.

Another example of a fault tolerance mechanism provided to current data storage devices is an end-to-end retransmission scheme. The end-to-end retransmission scheme is utilized to create a reliable memory fabric that retransmits individual packets or entire routes that are lost enroute to a protocol agent due to transient issues such as electrical interference, or persistent issues such as the failure of a routing component, cable, or connector.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
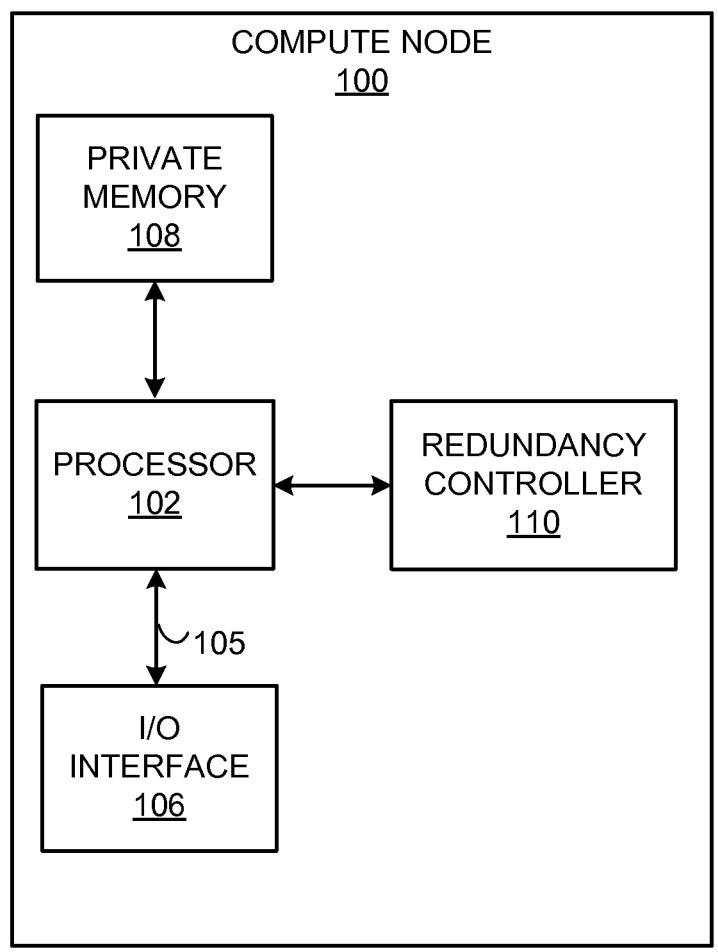
FIG. 1A shows a simplified block diagram of a compute node to determine a failed component in a fault-tolerant memory fabric, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

In addition, the following terms will be used throughout the remainder of the present disclosure. The term fabric may mean some combination of interconnected fabric devices used to convey packet-based information between endpoint components. The term memory fabric may mean a fabric used, at least in part, to provide connectivity between redundancy controllers and media controllers. The term lossy fabric may mean a fabric architecture where individual packets are occasionally dropped for transient reasons such as fabric congestion management, link-level ECC errors resulting from electrical problems, etc. Lossy fabric, however, does not imply unreliable protocol layer. A reliable protocol layer can be built on top of the lossy fabric using end-to-end protection to retransmit any packets that are lost. The term lossless fabric may mean a fabric architecture that guarantees that packets are never dropped from a healthy memory fabric. In this regard, packet loss can only result from a fault such as a failed fabric device.

The term protocol may mean a packet level semantic convention used by protocol agents. The term protocol agents may mean endpoints (e.g., producers and consumers of data) that communicate with each other over a memory fabric. The terms request or request packet may mean a packet sent from a redundancy controller to a media controller, usually indicating a desired memory activity such as a read or a write. The terms response or response packet may mean a packet sent from a media controller back to a redundancy controller from which it earlier received a request. The response may indicate completion of the requested activity, supply memory read data, error status, etc. The response also implicitly acknowledges that the original request was received by the media controller. The term ping may mean an exchange of a special request packet from requestor to responder and a corresponding special response packet from responder to requestor. A ping is used only to test the viability of the connection between the protocol agents. The packets involved may be termed ping-request and ping-response packets. The term cycle may mean a ping or packet on each of the routes existing between a requesting protocol agent and a responding protocol agent.

The term redundancy controller may mean a requesting protocol agent that acts on behalf of a central processing unit (CPU), input output (I/O) device, or other user of memory, and generates requests such as read and write requests to one or more responding protocol agents (e.g., media controllers). The redundancy controller may be the attachment point where producers or consumers of data attach to the fabric. The redundancy controller may communicate with multiple media controllers and may implement redundant storage of data across more than one media controller on behalf of a CPU, I/O device, etc., such that the failure of a subset of the media controllers will not result in loss of data or interruption of system operation. The term media controller may mean a responding protocol agent that connects memory or storage devices to a memory fabric. The media controller may receive requests such as read and write requests, control the memory or storage devices, and return corresponding responses. The media controller may be the attachment point where data storage components attach to the memory fabric. The term fabric device may mean a device along a route between route endpoints in the memory fabric, such as a switch, a router, hub, voltage regulator, clock generator, fabric crossbar, connector, etc.

The term command may mean a transaction sent from a processor, I/O device or other source to a redundancy controller, which causes the redundancy controller to issue a sequence. The term primitive may mean a single request issued by a redundancy controller to a media controller along with its corresponding response from the media controller back to the redundancy controller. The term sequence may mean an ordered set of primitives issued by a redundancy controller to one or more media controllers to execute a command received from a processor, I/O device or other source. The term locked sequence may mean a sequence that ensures atomic access to multiple media controllers. The term cacheline may mean a unit of data that may be read from or written to a media controller by a redundancy controller. The term is not intended to be used restrictively. The cacheline may include any type or size of data, such as a disk sector, a solid-state drive (SSD block), a RAID block or a processor cacheline. The term stripe may mean a set of one or more data cachelines and associated redundancy information stored in one or more parity cachelines that is distributed across multiple memory modules. The term RAID may mean a use of multiple media controllers each with its own memory devices, to store redundant data in a manner such that the failure of a single media controller or its memory devices will not result in loss of data, nor loss of access to data. Variations which tolerate the failure of a larger number of media controllers or memory devices are also covered by this term. The term RAID degraded mode may mean a mode of operation of a RAID redundancy controller following the failure of a survivable subset of the media controllers or their memory devices. In degraded mode, reads and writes access the surviving media controllers only. The term single point of failure may mean an architecture in which the failure of a single redundancy controller can prevent the continued operation of other redundancy controllers, or continued accessibility of the data.

Disclosed herein are examples of methods to determine a failed or dead component and prevent silent data corruption in a packet-switched fault-tolerant memory fabric. The fault-tolerant memory fabric may be a packet-switched memory fabric that connects one or more requesting protocol agents to a plurality of responding protocol agents. The fault-tolerant memory may, for instance, implement RAID storage technology. A silent data corruption hazard results from unsynchronized entry of multiple requesting protocol agents (i.e., redundancy controllers) into a RAID degraded mode in the event of multiple independent fabric device failures or inactivity as further described below.

Accordingly, the disclosed examples provide a method to synchronize the entry into a degraded mode for multiple requesting protocol agents that are affected by the failure or inactivity of a responding protocol agent (i.e., media controller). The disclosed examples, for example, provide protocol-layer interactions between redundancy controllers and media controllers such that a redundancy controller that loses contact with a media controller does so in a manner where it can distinguish between failure of a media controller and the failure of multiple fabric devices. Thus, the degraded mode is used to handle media controller failures, while fabric device failures would result in a shutdown of the redundancy controller.

According to an example, a redundancy controller from a plurality of redundancy controllers in the memory fabric may request packets (e.g., request ping packets) along a plurality of routes between the redundancy controller and a media controller in periodic cycles. The redundancy controller may determine whether route failures for all of the plurality of routes have occurred within a number of consecutive periodic cycles. A route failure, for instance, is determined to have occurred if a response packet (e.g., response ping packet) is not received along the same route on which the request packet was transmitted within a periodic cycle.

In response to determining that route failures for all of the plurality of routes have occurred within the number of consecutive periodic cycles, the redundancy controller establishes that the media controller has failed. Accordingly, the redundancy controller may enter a degraded mode, wherein the degraded mode allows continued access to data previously stored on the failed media controller through use of redundant data stored on other media controllers.

On the other hand, in response to determining that route failures for less than all of the plurality of routes have occurred within the number of consecutive periodic cycles, the redundancy controller establishes that a fabric device has failed. Accordingly, the redundancy controller may transmit request packets along remaining routes that are functional and monitor for route failures in the remaining functional routes. The redundancy controller may be shut down in response to a determination from the monitoring that route failures in the remaining functional routes have occurred during a periodic cycle subsequent to the number of consecutive periodic cycles. In this scenario, the use of routes through the fabric devices that are dependent upon the redundancy controller may be reenabled after the memory fabric is repaired.

According to an example, each of the plurality of redundancy controllers transmit request packets along a plurality of routes between each of the redundancy controllers and the media controller in periodic cycles, and each of the plurality of redundancy controllers determine whether route failures for all of the plurality of routes have occurred within a number of consecutive periodic cycles. In response to each of the plurality of redundancy controllers determining that route failures for all of the plurality of routes have occurred within the number of consecutive periodic cycles, each of the plurality of redundancy controllers is transitioned to a degraded mode to prevent silent data corruption.

End-to-end retransmission sequences ensure reliable operation of a memory fabric despite the loss of packets. A specific example of an end-to-end retransmission sequence is a protocol layer end-to-end retransmission sequence where entire protocol-layer primitives (i.e., a memory-access primitives such as read-request sent from the redundancy controller, and the corresponding response packet such as a read-data-return, which doubles as an acknowledgement) are timed by the redundancy controller that issues the request, and the entire requested primitive is repeated in the event that the entire requested primitive does not complete. It is noted that the disclosed examples are also applicable to other types of exchanges besides read primitives, and to other end-to-end protection variations, such as those using an explicit transport layer, distinct from the protocol layer, with a dedicated acknowledgement packet distinct from the protocol-layer response.

In an end-to-end retransmission sequence for example, each request packet that crosses the multi-hop memory fabric is acknowledged by an acknowledgment message crossing back in the other direction. Accordingly, a requesting redundancy controller waits for the acknowledgement message while holding a copy of the requested packet in a replay buffer so that it can be resent if the acknowledgement message never arrives back at the redundancy controller. A resend of the copy of the requested packet from the replay buffer is triggered by the expiration of a predetermined time threshold, possibly via an alternate fabric route. The end-to-end retransmission sequence may result in an ambiguous detection of a failed media controller. Specifically, when a media controller fails catastrophically (i.e., is unable to respond in any way to any requests received from the redundancy controller), the media controller failure may be indistinguishable from a total failure of a fabric device in the last surviving fabric route between the two protocol agents. In other words, the redundancy controller knows that either (i) the request packet or the corresponding acknowledgement packet has been lost in transport, or (ii) the media controller has failed.

In this example, the redundancy controller may attempt to resend the lost request packet, possibly multiple times, and each time monitor whether a timely acknowledgement packet is returned within a predetermined time threshold. But, if repeated attempts to resend the request packet all result in a similar timeout, then the nature of the failure can be assumed to be a "hard" failure rather than just a transient delivery failure such as a dropped packet. In the process of repeatedly resending the request packet, the redundancy controller may give up on one route through the memory fabric, and attempt to use another route. This is called a route failover, or a path migration. If a repeated attempt to resend the request packet always result in similar timeout after route migration has been attempted to all possible paths, then the nature of the failure may be assumed to be either (i) a failure of the media controller itself, or (ii) a combined failure of multiple fabric devices that affect all routes between the redundancy controller and the media controller. In most cases, the latter would be an unrecoverable error, and system operation would be interrupted.

If the media controller has failed, redundant storage technology such as RAID may ensure uninterrupted operation of the memory fabric system by invoking a degraded mode where the failed media controller is permanently removed from the RAID-protected data set. But, in the event of combined failure of multiple fabric routes, a different outcome is necessary to avoid a silent data corruption hazard. A silent data corruption hazard results from the unsynchronized entry of multiple requesting redundancy controllers into the degraded mode in the event of multiple independent fabric device failures. The examples disclosed herein relate to fault-tolerant memory fabrics where there are multiple redundancy controllers. If there were only a single redundancy controller accessing the data on the media controllers, there would be no silent corruption of the data.

For example, consider that the cause of the repeated timeouts is due to multiple independent fabric device failures. This results in permanent loss of communication between a redundancy controller and a media controller. However, since the redundancy controller does not unambiguously know that the cause of the failures is due to multiple independent fabric device failures, the redundancy controller would enter degraded mode to ensure uninterrupted access to the data stored in the media controller. The degraded mode, for example, allows continued operation and continued access to the data that has been lost when the media controller failed through the use of redundant data stored on other healthy media controllers. Once in degraded mode, the failed media controller is in effect permanently removed from service, but the remaining set of associated media controllers continues to operate with reduced redundancy.

A difficulty arises if there are multiple redundancy controllers that can access the same set of media controllers. For example, consider the scenario where two redundancy controllers were to access a shared set of healthy media controllers, but only a first of the redundancy controllers enters degraded mode because the first redundancy controller assumes that a particular media controller has failed. The fact that the redundancy controllers are not in agreement about degraded mode can cause silent data corruption in several ways. For instance, consider the scenario where the first redundancy controller, which is in degraded mode, attempts to write to a data cacheline on the media controller that the first redundancy controller assumes has failed. Since the first redundancy controller cannot write the data directly to the media controller which is assumed to be failed, the first redundancy controller instead skips writing to this media controller and updates another media controller that contains a parity cacheline corresponding to the associated stripe. Unfortunately, this leaves an inconsistency between the stored data and parity for the associated stripe. Thus, this may result in silent data corruption if the second redundancy controller, which is not in degraded mode, attempts to read the same data cacheline. As a result, the second redundancy controller may retrieve a stale copy of the data from the media controller, which the first redundancy controller skipped writing to under the incorrect assumption that the media controller had failed. Accordingly, the identification of a true nature of a memory fabric failure is critically important to avoid silent data corruption in the fault-tolerant memory fabric.

The technical benefits and advantages of the present disclosure include providing RAID protection of data over a resilient, fault-tolerant memory fabric that supports multiple redundancy controllers that representing multiple independent, asynchronous sources of memory accesses (e.g., servers, I/O devices, CPUs, accelerators, etc.). The present disclosure provides RAID protection while eliminating silent data corruption that may result from the unsynchronized entry of the multiple redundancy controllers into a degraded mode due to multiple independent fabric device failures.

With reference to FIG. 1A, there is shown a block diagram of a compute node (e.g., computing device, input/output (I/O) server node) 100 for determining a failed component in a fault-tolerant memory fabric according to an example of the present disclosure. It should be understood that the compute node 100 may include additional components and that one or more of the components described herein may be removed and/or modified without departing from a scope of the compute node 100.

For example, the compute node 100 may include a processor 102, an input/output interface 106, a private memory 108, and a redundancy controller 110. In one example, the compute node 100 is a server but other types of compute nodes may be used. The compute node 100 may be a node of a distributed data storage system. For example, the compute node 100 may be part of a cluster of nodes that services queries and provides data storage for multiple users or systems, and the nodes may communicate with each other to service queries and store data. The cluster of nodes may provide data redundancy to prevent data loss and minimize down time in case of a node failure.

The processor 102 may be a microprocessor, a microcontroller, an application specific integrated circuit (ASIC), field programmable gate array (FPGA), or other type of circuit to perform various processing functions. The private memory 108 may include volatile dynamic random access memory (DRAM) with or without battery backup, non-volatile phase change random access memory (PCRAM), spin transfer torque-magnetoresistive random access memory (STT-MRAM), resistive random access memory (reRAM), memristor, FLASH, or other types of memory devices. For example, the memory may be solid state, persistent, dense, fast memory. Fast memory can be memory having an access time similar to DRAM memory. The I/O interface 106 may include a hardware and/or a software interface. The I/O interface 106 may be a network interface connected to a network, such as the Internet, a local area network, etc. The compute node 100 may receive data and user-input through the I/O interface 106. Where examples herein describe redundancy controller behavior occurring in response to commands issued by the processor 102, this should not be taken restrictively. The examples are also applicable if such commands are issued by an I/O device via interface 106.

The components of computing node 100 may be coupled by a bus 105, where the bus 105 may be a communication system that transfers data between the various components of the computing device 100. In examples, the bus 105 may be a Peripheral Component Interconnect (PCI), Industry Standard Architecture (ISA), PCI-Express, HyperTransport®, NuBus, a proprietary bus, and the like. Alternatively, the processor 102 may use multiple different fabrics to communicate with the various components, such as PCIe for I/O, DDR3 for memory, and QPI for the redundancy controller.

The redundancy controller 110, for example, may act on behalf of the processor 102 and generate sequences of primitives such as read, write, swap, XOR, lock, unlock, etc. requests to one or more responding protocol agents (e.g., media controllers 120A-M) as discussed further below with respect to FIG. 1B. The redundancy controller 110 may communicate with multiple ones of the media controllers 120A-M, in which "M" represents an integer value greater than one, and may implement redundant storage of data across more than one media controller on behalf of the processor 102 such that the failure of a subset of the media controllers 120A-M will not result in loss of data or interruption of system operation. The redundancy controller 110, for example, may generate certain sequences of primitives independently, not directly resulting from processor commands. These include sequences used for scrubbing, initializing, migrating, or error-correcting memory. The functionality of the redundancy controller 110 may be implemented by hardware.

Figure 1B:
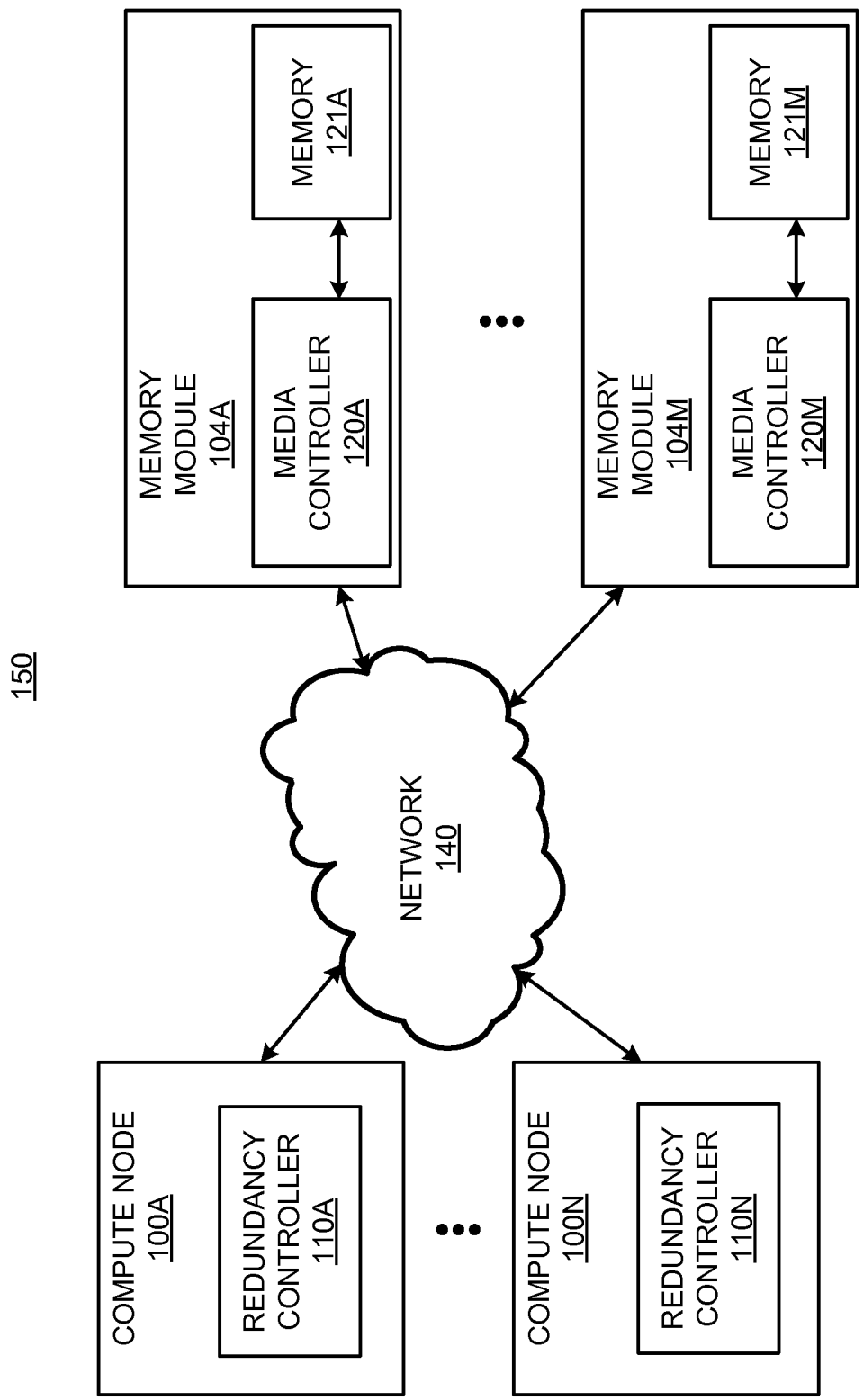
FIG. 1B shows a block diagram of a fault tolerant system, according to an example of the present disclosure.

With reference to FIG. 1B, there is shown a block diagram of a fault tolerant system 150 according to an example of the present disclosure. It should be understood that the system 150 may include additional components and that one or more of the components described herein may be removed and/or modified without departing from a scope of the system 150. The system 150 may include multiple compute nodes 100A-N (where the number of compute nodes is greater than or equal to 1), a network 140, and memory modules 104A-M.

The multiple compute nodes 100A-N may be coupled to the memory modules 104A-M through the network 140. The memory modules 104A-M may include media controllers 120A-M and memories 121A-M. Each media controller, for instance, may communicate with its associated memory and control access to the memory by the redundancy controllers 110A-N, which in turn are acting on behalf of the processors. The media controllers 120A-M provide access to regions of memory. The regions of memory are accessed by multiple redundancy controllers in the compute nodes 100A-N using access primitives such as read, write, lock, unlock, swap, XOR, etc. In order to support aggregation or sharing of memory, media controllers 120A-M may be accessed by multiple redundancy controllers (e.g., acting on behalf of multiple servers). Thus, there is a many-to-many relationship between redundancy controllers and media controllers. Each of the memories 121A-M may include volatile dynamic random access memory (DRAM) with battery backup, non-volatile phase change random access memory (PCRAM), spin transfer torque-magnetoresistive random access memory (STT-MRAM), resistive random access memory (reRAM), memristor, FLASH, or other types of memory devices. For example, the memory may be solid state, persistent, dense, fast memory. Fast memory can be memory having an access time similar to DRAM memory.

As described in the disclosed examples, the redundancy controllers 110A-N may maintain fault tolerance across the memory modules 104A-M. The redundancy controller 110 may receive commands from one or more processors 102, I/O devices, or other sources. In response to receipt of these commands, the redundancy controller 110 generates sequences of primitive accesses to multiple media controllers 120A-M. The redundancy controller 110 may also generate certain sequences of primitives independently, not directly resulting from processor commands. These include sequences used for scrubbing, initializing, migrating, or error-correcting memory. The media controllers 120A-M may then respond to the requested primitives with an acknowledgment response.

RAID stripe locks acquired and released by the redundancy controller 110 guarantee atomicity for locked sequences. Accordingly, the shortened terms "stripe" and "stripe lock" has been used throughout the text to describe RAID stripes and locks on RAID stripes, respectively. For any given stripe, actual manipulation of the locks, including request queueing, lock ownership tracking, granting, releasing, and breaking, may be managed by the media controller that stores the parity cacheline for the stripe. Locking and unlocking is coordinated between the redundancy controllers and the relevant media controllers using lock and unlock primitives, which include lock and unlock request and completion messages. Media controllers 120A-M implement lock semantics on a per-cacheline address basis. Cachelines that represent stripe parity storage receive lock and unlock primitives from redundancy controllers, while those that represent data storage do not receive lock and unlock primitives. By associating locks with cacheline addresses, media controllers 120A-M may participate in the locking protocol without requiring explicit knowledge about the stripe layouts implemented by the redundancy controllers. Where the term "stripe lock" is used herein in the context of media controller operation, this should not be taken to imply any knowledge by the media controller of stripe layout. Media controllers 120A-M may identify requests to a locked stripe by address only, without regard to the stripe layout.

Figure 1C:
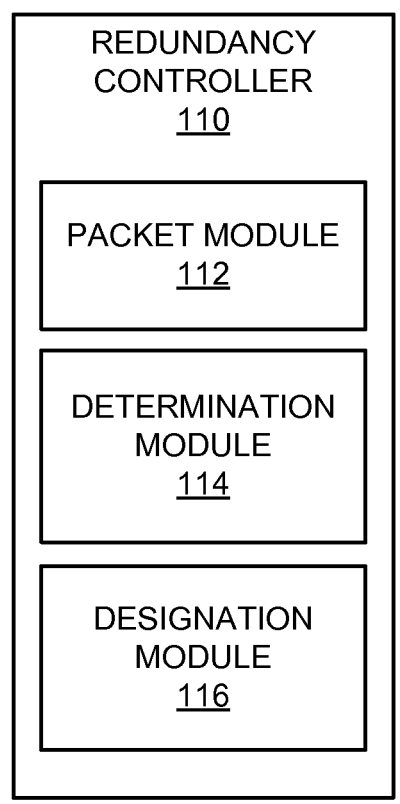
FIG. 1C shows a redundancy controller, according to an example of the present disclosure.

FIG. 1C shows a redundancy controller 110 according to an example of the present disclosure. The redundancy controller 110 in this example may be any one of redundancy controllers 110A-N shown in FIG. 1B. The redundancy controller 110 may include and process the functions of a packet module 112, a determination module 114, and a designation module 116.

The packet module 112, for instance, may send request packets (e.g., pings) along a plurality of routes between the redundancy controller 110 and a media controller in periodic cycles. The determination module 114, for instance, may determine whether route failures for all of the plurality of routes have occurred within a number of consecutive periodic cycles. The designation module 116, for instance, may designate a failed media controller in response to determining that route failures for all of the plurality of routes have occurred within the number of consecutive periodic cycles, and designate a failed fabric device in response to determining that route failures for less than all of the plurality of routes have occurred within the number of consecutive periodic cycles. In this example, modules 112-116 are circuits implemented in hardware. In another example, the functions of modules 112-116 may be machine readable instructions stored on a non-transitory computer readable medium and executed by a processor, as discussed further below in FIG. 7.

Figure 2:
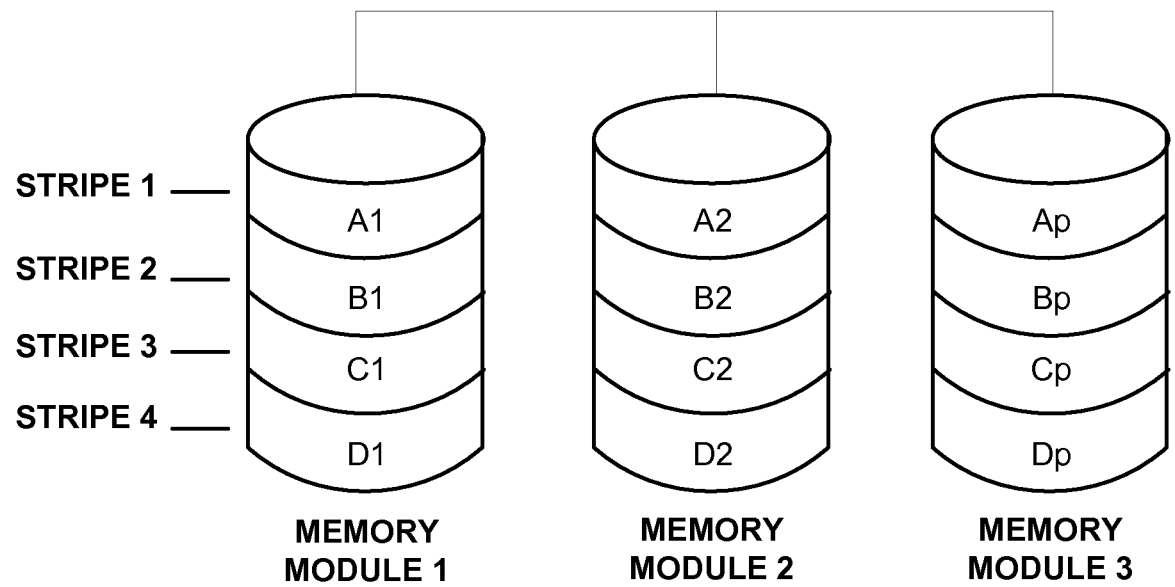
FIG. 2 shows RAID stripes across multiple memory modules in a fault tolerant-memory fabric, according to an example of the present disclosure.

Referring to FIG. 2, the fault tolerant scheme disclosed herein may use memory associated with multiple memory modules (memory module 1, memory module 2, and memory module 3) to store RAID blocks A1-Dp, in which "p" represents an integer value greater than one. According to this example, each RAID block may include a single cacheline. A cacheline is the largest unit of data that can be atomically read or written to a memory module. A cacheline could be of any size used by processors, such as 64 bytes. The use of a single cacheline RAID block size should not be taken restrictively. Cachelines A1, A2, B1, B2, C1, C2, D1, and D2 represent data cachelines that are distributed across memory module 1 and memory module 2. Cachelines Ap, Bp, Cp, and Dp represent parity cachelines that are stored in memory module 3. The parity cachelines provide redundancy for the data cachelines.

A stripe may include a combination of data cachelines from at least one memory module and parity cachelines from at least one other memory module. In other words, a stripe may include memory blocks distributed across multiple modules which contain redundant information, and must be atomically accessed to maintain the consistency of the redundant information. For example, one stripe may include cachelines A1, A2, and Ap (stripe 1), another stripe may include cachelines 61, 62, and Bp (stripe 2)$_L$ another stripe may include cachelines C1, C2, and Cp (stripe 3), and another stripe may include cachelines D1, D2, and Dp (stripe 4). The data cachelines in a stripe may or may not be sequential in the address space of the processor 102. A RAID memory group may include stripes 1-4. The example in FIG. 2 represents a RAID-4 configuration, where all parity cachelines are stored on a single memory module. Other RAID configurations, such as RAID-1 where the parity cachelines are mirrors of the data cachelines, and RAID-5 where parity cachelines distributed across all memory modules, and other redundancy schemes are also covered by the present disclosure.

According to this example, if memory module 1 fails, the data cachelines from memory module 2 may be combined with the corresponding-stripe parity cachelines from memory module 3 (using the boolean exclusive- or function) to reconstruct the missing cachelines. For instance, if memory module 1 fails, then stripe 1 may be reconstructed by performing an exclusive- or function on data cacheline A2 and parity cacheline Ap to determine data cacheline A1. In addition, the other stripes may be reconstructed in a similar manner using the fault tolerant scheme of this example. In general, a cacheline on a single failed memory module may be reconstructed by using the exclusive- or function on the corresponding-stripe cachelines on all of the surviving memory modules.

FIGS. 3-6 respectively depict diagrams of methods 300-600 for determining failed components and prevent silent data corruption in a fault-tolerant memory fabric in a fault-tolerant memory fabric with multiple redundancy controllers and multiple media controllers according to examples of the present disclosure. It should be apparent to those of ordinary skill in the art that the methods 300-600 represent generalized illustrations and that other sequences may be added or existing sequences may be removed, modified or rearranged without departing from the scopes of the methods 300-600.

Figure 3:
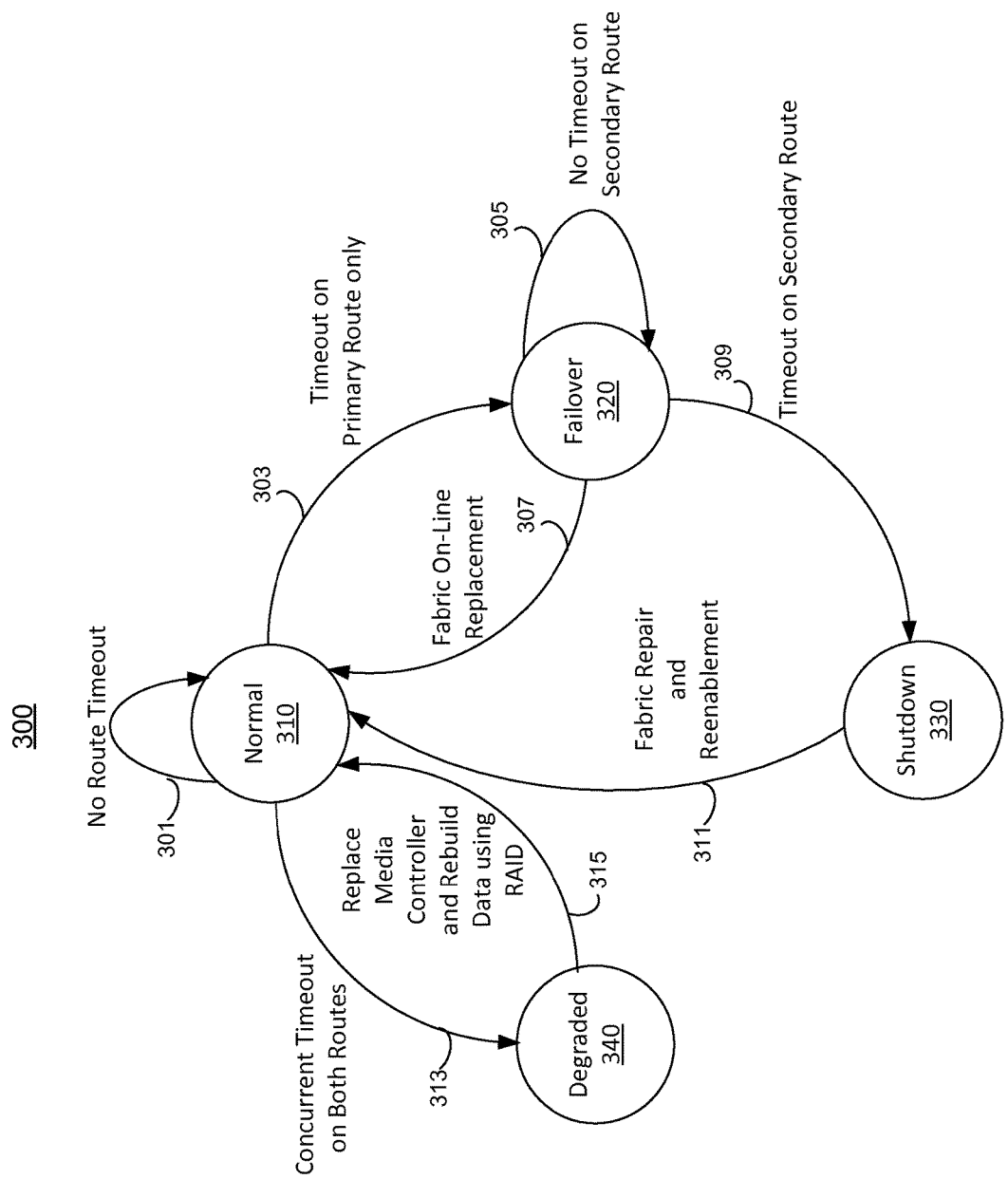
FIG. 3 shows a state diagram of a method to determine a failed component in a fault-tolerant memory fabric, according to an example of the present disclosure.

FIG. 3 shows a state diagram of a method 300 to determine failed components and prevent silent data corruption in a fault-tolerant memory fabric, according to an example of the present disclosure. According to the disclosed example, a redundancy controller may distinguish between a true media controller failure and failures of multiple fabric devices when the redundancy controller loses contact with the media controller. A degraded mode may be used to handle a true media controller failure, while the failure of multiple fabric devices may result in the redundancy controller shutting down. As shown in FIG. 3, the various states for a redundancy controller may include a normal state 310, a failover state 320, a shutdown state 340, and a degraded mode 330.

A redundancy controller may operate in a normal state 310 if there are multiple routes not experiencing timeouts to a media controller, as shown in state loop 301. In other words, the redundancy controller may operate in the normal state 310 if the redundancy controller sends request packets along the routes to a media controller and receives response packets (e.g., acknowledgement) back from the media controller along more than one of the same routes within a predetermined time threshold. For simplification, examples of method 300 describe two routes between the redundancy controller and the media controller (i.e., the primary route and the failover route). Accordingly, if there are no timeouts in either the primary route or failover route, the redundancy controller operates in the normal state 310, as shown in loop 301. It is noted that the disclosed examples are not limited to these two routes and may include any plurality of routes between the redundancy controller and the media controller.

According to an example, the health of all routes in the memory fabric between redundancy controllers and their associated media controller are tested in periodic cycles with a ping protocol. The ping protocol, for example, is where a ping-request packet is sent from a redundancy controller on each route in the memory fabric and a corresponding ping-response packet is returned on each respective route. The ping-request and ping-response packets carry no useful information and serve only as a test of successful delivery of the packets along the round-trip routes. In this regard, outstanding pings are timed, and if no ping response is received within a certain predetermined time threshold, then either the fabric route or the media controller have failed. For example, a periodic cycle may include, but is not limited to, one ping on each route per millisecond. In other examples, the periodic cycle may be determined based on a tradeoff calculation. That is, higher ping rates may give stronger resistance to silent data corruption risks, whereas lower ping rates may consume less bandwidth overhead on the memory fabric.

The use of the ping protocol may ensure that any fabric device failure is detected within a millisecond of its occurrence for example, and may ensure that a failure of the media controller is distinguishable from a pair of independent fabric device routing failures. In the absence of the ping protocol, the failure of a single route could only be detected the next time a memory access happens to depend upon that route. Based upon the unpredictability of a RAID traffic pattern, there may be no upper bound on to that delay. Accordingly, without the ping protocol, a first memory fabric failure may not even be detected until after the second failure has already occurred, which undermines the fault-tolerance and data integrity of the memory fabric because discovery of the first failure does not occur in time to allow the first failure to be repaired prior to the occurrence of the second failure. In this scenario, even if the two memory fabric failures occur widely separated in time, the two memory fabric failures are both observed by a redundancy controller at the same time (i.e., the next time the redundancy controller attempts to access the media controller). The fact that the two memory fabric failures are observed at the same moment in time is what makes the multiple independent fabric device failures indistinguishable from a media controller failure.

The ping protocol, however, may only be required when there is no routine RAID traffic pattern. A redundancy controller may opportunistically skip sending a ping for a given route if the redundancy controller instead sends other packets that may serve the same purpose (e.g., a normal RAID read or write request on the same route at the same time). Thus, explicit pings may only be required when there would otherwise be no packet exchange between the redundancy controller and media controller at the time needed and on the route to be tested. The pings therefore impose little or no additional bandwidth burden on the memory fabric during times when the memory fabric is already heavily utilized.

The redundancy controller may transition to the failover state 320 in response to the timeout of the primary route within a number of consecutive periodic cycles (e.g., within two periodic cycles), as shown in transition state 303. In the failover state 320, the redundancy controller may resend a request packet to the media controller on the secondary route as long as there is no timeout on the secondary routes within the number of consecutive periodic cycles, as shown in state loop 305. According to an example, the results of a single periodic cycle of pings are not interpreted in isolation. For instance, if some routes time out and others do not within a single periodic cycle, this does not necessarily indicate that some routes have failed and while other routes are still functioning. A single media controller fault may still be responsible if the fault occurred sometime during the periodic cycle of pings. For example, the requested ping packets that reached the media controller before the fault may receive response ping packet, while requested ping packets that arrived after the fault are timed out. Accordingly, the timeout of a route should be determined within a number of consecutive periodic cycles (e.g., within two periodic cycles), as shown in transition state 303.

No data corruption hazard exists until the redundancy controller completely loses contact with the media controller. So long as even one route survives, there is no reason for the redundancy controller to consider transitioning the degraded mode 340. Also, the failure of all routes to the media controller requires multiple independent fabric device failures. That is, in a properly-designed high-availability fault-tolerant memory fabric, it is unacceptable that one single fabric device failure could result in the simultaneous loss of all routes from the redundancy controller to the associated media controller. A single fabric device failure might cause the loss of a subset of the routes, but only a combination of multiple independent failures of the fabric devices may result in the loss of all routes.

As shown in transition state 307, a failed fabric device on the primary route should be replaced prior to a failure of the secondary route to provide uninterrupted and resilient operation of the high-availability memory fabric. In other words, when the initial or partial route loss occurs, a repair or replacement of the failed fabric devices on the primary route may be scheduled. If the failed fabric devices are replaced before a failure of the secondary route, fabric resilience has been restored and uninterrupted operation of the memory fabric is maintained.

However, if the failed fabric devices are not replaced in transition state 307 prior to a failure of the secondary route, the loss of the secondary route may be ambiguous to the redundancy controller. That is, the loss of the secondary route may be attributed to either the failure of a second independent fabric device on the secondary route or a failure of the media controller. As discussed above, it may not be safe for the redundancy controller to transition to the degraded mode 340 after the loss of all of the routes to the media controller because of the risk of a silent data corruption. The silent data corruption may occur in the event that the secondary route failure was due to the failure of the second independent fabric component rather than the failure of the media controller. In other words, when multiple fabric devices fail, which isolates a redundancy controller from being able to communicate with the media controller, the failure may not affect all redundancy controllers because the routes from another redundancy controller to the same media controller may not depend upon the same failed fabric devices. Thus, the affected redundancy controller may transition to the degraded mode 340, while other redundancy controllers do not. As noted earlier, the unsynchronized entry in to degraded mode by two or more redundancy controllers may result in a silent data corruption.

Therefore, to avoid silent data corruption, the redundancy controller may transition to a shutdown state 330 if the failed fabric devices are not replaced prior to a timeout on the secondary route, as shown in transition state 309. In other words, the redundancy controller may assume a fabric device failure and transition to the shutdown state 330 in response to failing to receive a response packet on the secondary route during a periodic cycle that is subsequent to the two initial consecutive periodic cycles. Thus, starting with a healthy memory fabric where multiple viable routes exist from the redundancy controller to the media controller, if all routes appear to fail some time apart (e.g., two consecutive periodic cycles representing partial loss of routes, before the remaining routes are eventually lost), the redundancy controller must not transition to the degraded mode 340, but may transition to the shutdown state 330 if and when the remaining routes are lost. After the redundancy controller is in the shutdown state 330, a memory fabric repair of the part of the memory fabric that is dependent upon the redundancy controller may be performed as shown in transition state 311.

As discussed above, silent data corruption may occur if multiple redundancy controllers operate under mutually-inconsistent assumptions about which, if any, media controllers have failed. According to the disclosed examples, if one single redundancy controller assumes that a media controller has failed, then all other redundancy controllers must also assume that the media controller as failed. In this regard, the silent data corruption hazards discussed above can never occur. This does not imply that multiple redundancy controllers must transition to the degraded mode 340 at the exact same time. The multiple redundancy controllers may transition to the degraded mode 340 at a consistent point in the sequence of reads and write that they issue to the failed media controller. Thus, if the nature of the failure is catastrophic media controller failure (e.g., where the media controller abruptly stops responding to any and all access requests, regardless of the redundancy controller the access requests arrive), then all read or write requests arriving at the media controller subsequent to the failure from any of the redundancy controllers, may eventually be completed using the degraded mode 340. Accordingly, there is no harmful mixing of some redundancy controllers writing in the degraded mode 340 while others do not write in the degraded mode 340. Similarly, if the nature of the failure is detectable by the otherwise functioning media controller (e.g., detects permanent and uncorrectable failure of some region of memory or storage), the media controller may ensure a safe transition into degraded mode by all redundancy controllers by presenting itself as failed. The media controller may present itself as failed either by explicit response codes or by deliberately ceasing to respond to requests in an abrupt manner that affects all access requests received regardless of source.

The transition of all redundant controllers into the degraded mode 340 may be synchronized with a synchronous rendezvous between the redundancy controllers. For example, redundancy controller that has lost contact with a media controller might temporarily block further writes to affected stripe until it has directly communicated with other redundancy controllers, so that all redundancy controllers may transition to the degraded mode 340 in a coordinated and synchronous fashion. While functionally robust, example may be impractical within a high-availability fault-tolerant memory fabric since any direct communication between redundancy controllers creates additional potential single points of failure.

Thus, according to an example, a redundancy controller may transition to the degraded mode 340 when there are concurrent timeouts on all of the routes (e.g., primary route and secondary route) from the redundancy controller to the media controller as shown in transition state 313. For example the redundancy controller may transition to the degraded mode 340 when the redundancy controller does not receive response packets from any of the routes between the redundancy controller and the media controller within two consecutive periodic cycles. In this scenario, the redundancy controller may safely assume that the root cause of the route failures is a failed media controller. For a sufficiently high ping rate, the statistical likelihood of multiple independent faults developing in such a small time window is vanishingly small. In this example, the redundancy controller transitions to the degraded mode 340, and is safe from silent data corruption because the root cause is known to be media controller failure. Therefore, it is not possible for any other redundancy controller to continue normal operation without also transitioning to the degraded mode 340. Once the redundancy controllers are transitioned to the degraded mode 340, the failed media controller may be replaced and the data thereon may be rebuilt using RAID, as shown in transition state 315.

According to an example, the method 300 may take additional precautions if the underlying memory fabric is lossy. In a lossy memory fabric, pings may occasionally timeout due to transient ping-request or ping-response packet loss events, which are not representative of any fabric device failure. Thus, in a lossy memory fabric, the disclosed examples may make a determination of the failure of a route or a media controller based upon the results of a number of consecutive periodic cycles of pings. Accordingly, this determination may be sufficient to obviate the risk of misinterpretation due to transient effects.

Figure 4:
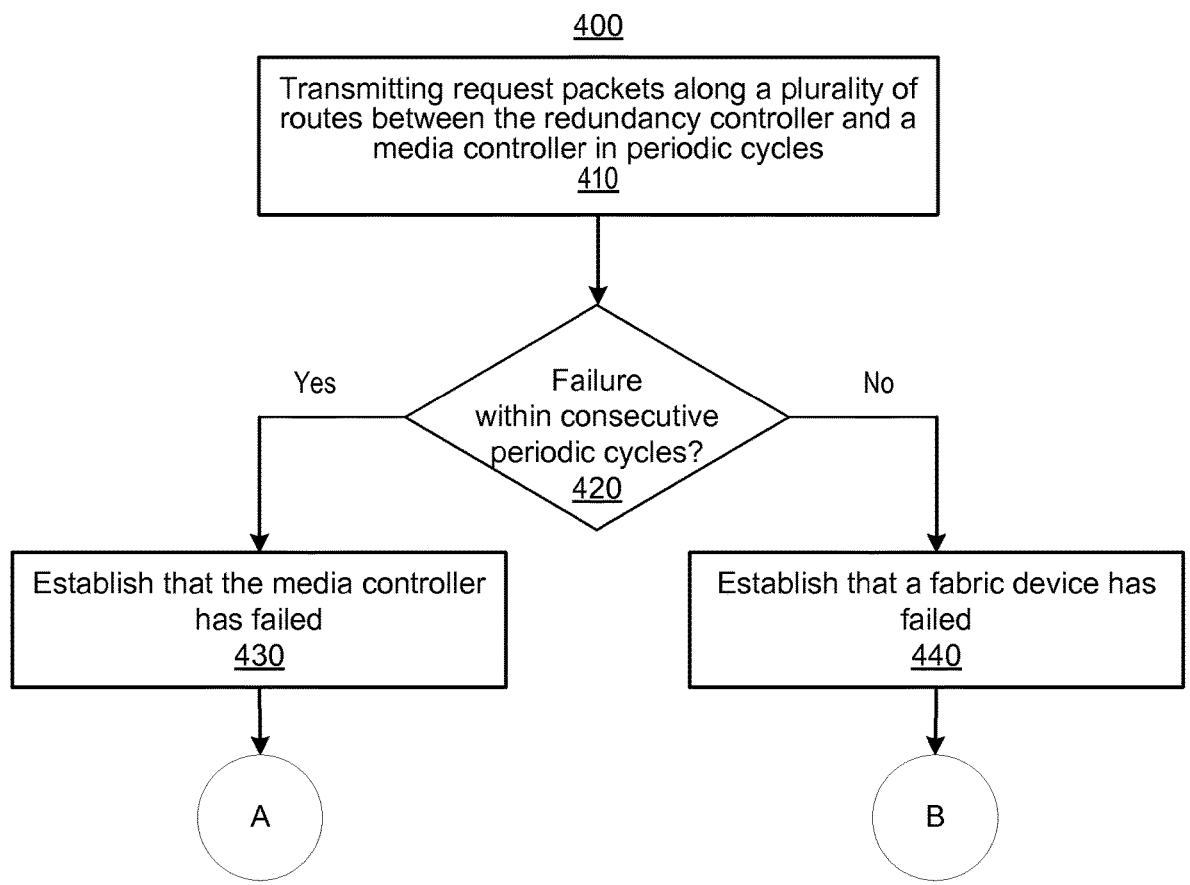
FIG. 4 shows a flow diagram of a method used by multiple redundancy controllers to determine a failed component in a fault-tolerant memory fabric, according to an example of the present disclosure.

With reference to FIG. 4, there is shown a flow diagram of a method 400 used by multiple redundancy controllers to determine failed components in a fault-tolerant memory fabric, according to an example of the present disclosure.

In block 410, a redundancy controller from a plurality of redundancy controllers in the memory fabric may transmit request packets along a plurality of routes between the redundancy controller and a media controller in periodic cycles. The request packets, for example, may be ping packets.

The redundancy controller may then determine whether route failures for all of the plurality of routes have occurred within a number of consecutive periodic cycles, as shown in block 420. The number of consecutive cycles, for instance, may be a number greater than one. A route failure, for instance, is determined to have occurred if a response packet to a request packet is not received along the same route on which the request packet was transmitted within a periodic cycle;

In response to determining that route failures for all of the plurality of routes have occurred within the number of consecutive periodic cycles, the redundancy controller may establish that the media controller has failed, as shown in block 430. On the other hand, in response to determining that route failures for less than all of the plurality of routes have occurred within the number of consecutive periodic cycles, the redundancy controller may establish that a fabric device has failed, as shown in block 440.

Figure 5:
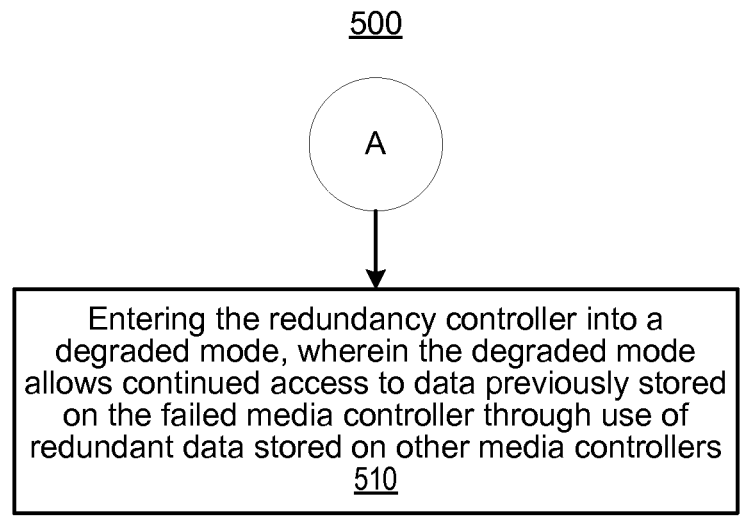
FIG. 5 shows a flow diagram of a method used by multiple redundancy controllers to prevent silent data corruption in a fault-tolerant memory fabric when a media controller fails, according to an example of the present disclosure.

With reference to FIG. 5, there is shown a flow diagram of a method 500 used by multiple redundancy controllers to prevent silent data corruption in a fault-tolerant memory fabric, according to an example of the present disclosure.

In response to establishing that the media controller has failed as shown in block 430 of FIG. 5, the redundancy controller may enter a degraded mode, as shown in block 510. The degraded mode, for example, allows continued access to data previously stored on the failed media controller through use of redundant data stored on other media controllers. According to an example, each of the plurality of redundancy controllers may transmit request packets along a plurality of routes between each of the redundancy controllers and the media controller in periodic cycles, and each of the plurality of redundancy controllers may determine whether route failures for all of the plurality of routes have occurred within a number of consecutive periodic cycles. Thus, in response to each of the plurality of redundancy controllers determining that route failures for all of the plurality of routes have occurred within the number of consecutive periodic cycles, each of the plurality of redundancy controllers may transition to a degraded mode to prevent silent data corruption.

Figure 6:
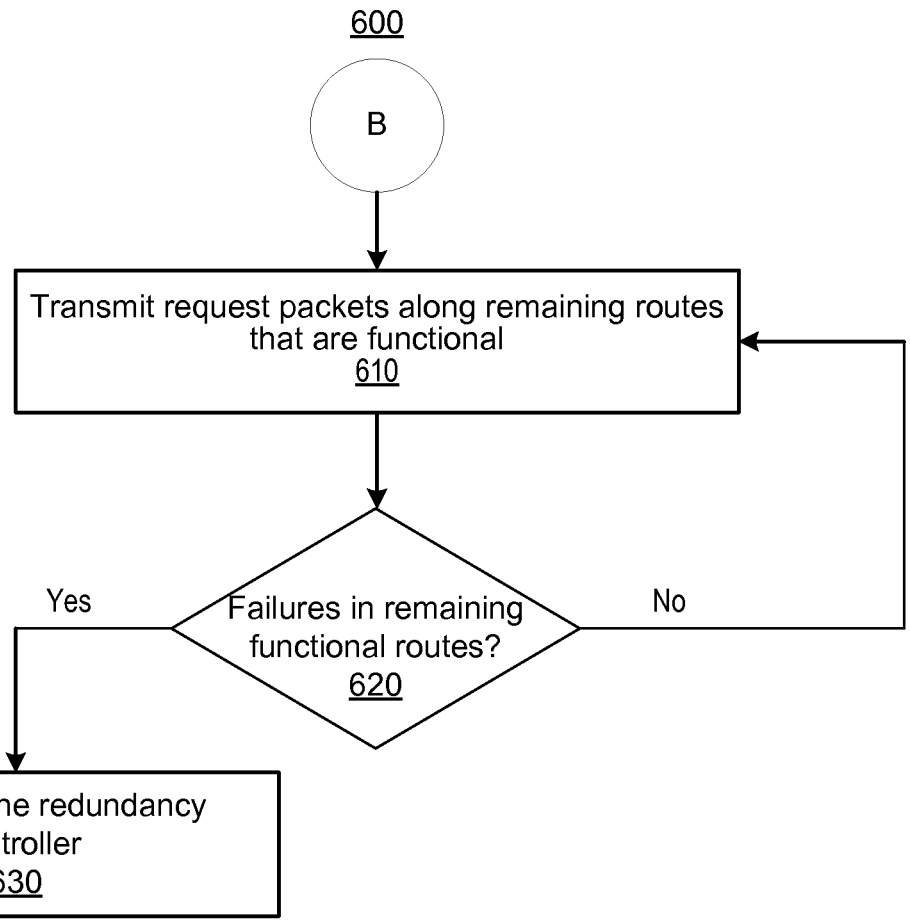
FIG. 6 shows a flow diagram of a method used by multiple redundancy controllers to prevent silent data corruption in a fault-tolerant memory fabric when multiple fabric devices fail, according to an example of the present disclosure.

With reference to FIG. 6, there is shown a flow diagram of a method 600 used by multiple redundancy controllers to prevent silent data corruption in a fault-tolerant memory fabric when multiple, independent fabric devices fail, according to an example of the present disclosure.

In response to establishing that a fabric device has failed as shown in block 440 of FIG. 4, the redundancy controller may transmit request packets along remaining routes that are functional as shown in block 610. In block 620, the redundancy controller may monitor for route failures in the remaining functional routes.

In response to a determination from the monitoring that route failures in the remaining functional routes have occurred during a periodic cycle subsequent to the number of consecutive periodic cycles, the redundancy controller may be shut down, as shown in block 630. According to an example, the memory fabric may be repaired following the shut down of the redundancy controller. As a result, the use of routes through the fabric devices that are dependent upon the redundancy controller may be reenabled.

On the other hand, in response to a determination from the monitoring that the remaining functional routes remain functional during a periodic cycle subsequent to the number of consecutive periodic cycles, the redundancy controller may continue to transmit request packets along the remaining routs that are functional.

Some or all of the operations set forth in the methods 300-600 may be contained as utilities, programs, or subprograms, in any desired computer accessible medium. In addition, the methods 300-600 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 7:
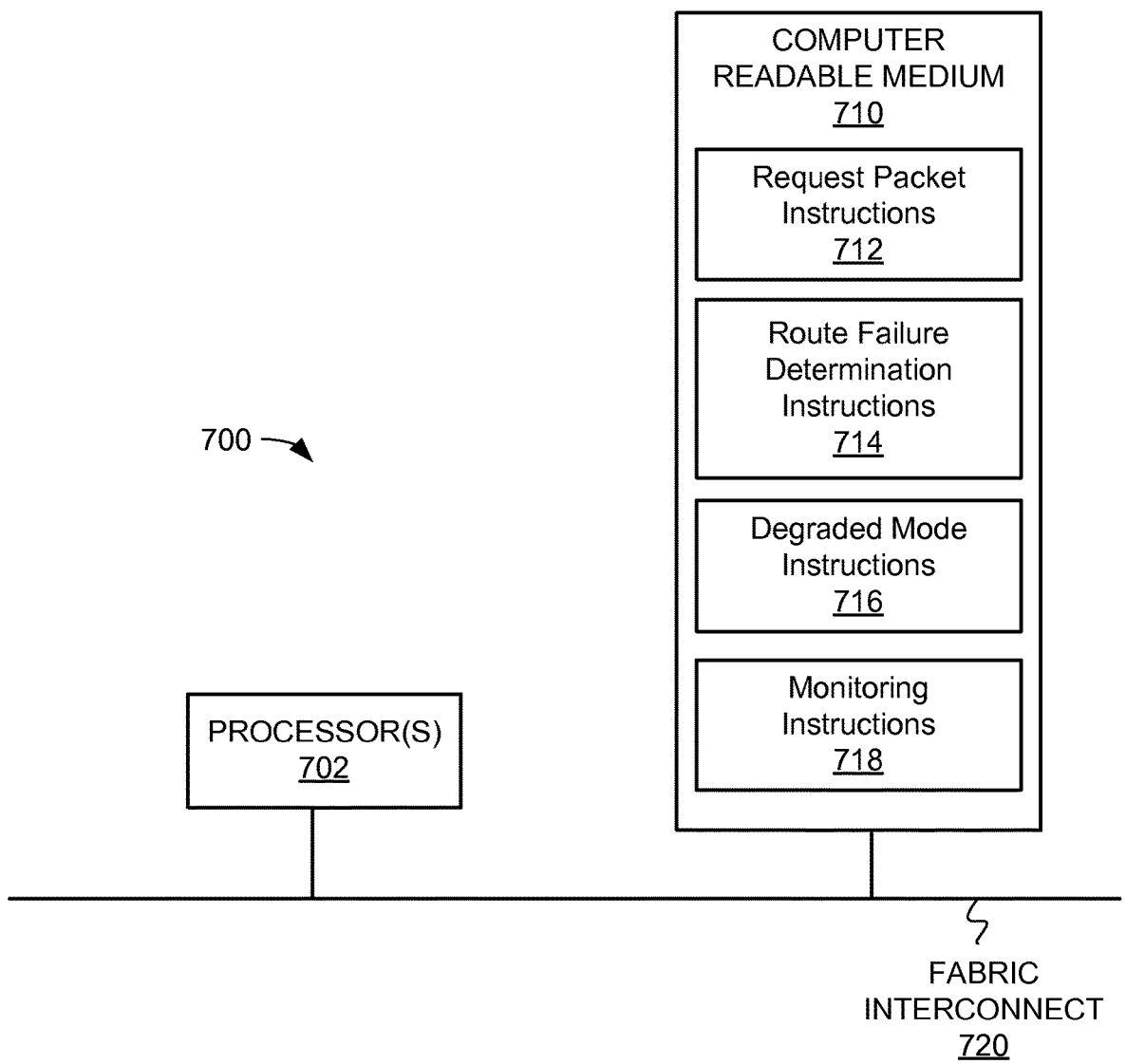
FIG. 7 shows a schematic representation of a computing device, which may be employed to perform various functions of a redundancy controller, according to an example of the present disclosure.

Turning now to FIG. 7, a schematic representation of a computing device 700, which may be employed to perform various functions of the redundancy controller 110 as depicted in FIG. 1C, is shown according to an example implementation. The device 700 may include a processor 702 coupled to a computer-readable medium 710 by a fabric interconnect 720. The computer readable medium 710 may be any suitable medium that participates in providing instructions to the processor 702 for execution. For example, the computer readable medium 710 may be non-volatile media, such as an optical or a magnetic disk; volatile media, such as memory.

The computer-readable medium 710 may store instructions to perform methods 300-600. For example, the computer-readable medium 710 may include machine readable instructions such as request packet instructions 712 to transmit request packets along a plurality of routes between a redundancy controller and a media controller in periodic cycles, route failure determination instructions 714 to determine whether route failures for all of the plurality of routes have occurred within a number of consecutive periodic cycles, degraded mode instructions 716 to activate a degraded mode, and monitoring instructions 718 to monitor for route failures in remaining functional routes. In this regard, the computer-readable medium 710 may include machine readable instructions to perform methods 300-600 when executed by the processor 702.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for determining failed component in a fault-tolerant memory fabric, the method comprising:
    transmitting, by a redundancy controller from a plurality of redundancy controllers in the memory fabric, request packets along a plurality of routes between the redundancy controller and a media controller in periodic cycles;
    determining whether route failures for all of the plurality of routes have occurred within a number of consecutive periodic cycles, wherein a route failure is determined to have occurred if a response packet to a request packet is not received along the same route on which the request packet was transmitted within a periodic cycle;
    in response to determining that route failures for all of the plurality of routes have occurred within the number of consecutive periodic cycles, establishing that the media controller has failed; and
    in response to determining that route failures for less than all of the plurality of routes have occurred within the number of consecutive periodic cycles, establishing that a fabric device has failed.

2. The method of claim 1, wherein establishing that the media controller has failed comprises:
    entering the redundancy controller into a degraded mode, wherein the degraded mode allows continued access to data previously stored on the failed media controller through use of redundant data stored on other media controllers.

3. The method of claim 1, wherein establishing that the fabric device has failed comprises:
    transmitting request packets along remaining routes that are functional; and
    monitoring for route failures in the remaining functional routes.

4. The method of claim 3, wherein monitoring for route failures in the remaining functional routes comprises:
    shutting down the redundancy controller in response to a determination from the monitoring that route failures in the remaining functional routes have occurred during a periodic cycle subsequent to the number of consecutive periodic cycles.

5. The method of claim 4, further comprising:
    reenable the use of routes through the fabric devices that are dependent upon the redundancy controller after the memory fabric is repaired.

6. The method of claim 1, wherein each of the plurality of redundancy controllers transmit request packets along a plurality of routes between each of the redundancy controllers and the media controller in periodic cycles, and each of the plurality of redundancy controllers determine whether route failures for all of the plurality of routes have occurred within a number of consecutive periodic cycles.

7. The method of claim 6, further comprising:
    in response to each of the plurality of redundancy controllers determining that route failures for all of the plurality of routes have occurred within the number of consecutive periodic cycles, transitioning each of the plurality of redundancy controllers to a degraded mode to prevent silent data corruption.

8. The method of claim 1, wherein the request packets and the response packets are ping packets.

9. A redundancy controller to determine a failed component a fault-tolerant memory fabric, the redundancy controller comprising:
 a packet module to send request ping-packets along a plurality of routes between the redundancy controller and a media controller in periodic cycles;
 a determination module to determine whether route failures for all of the plurality of routes have occurred within a number of consecutive periodic cycles, wherein a route failure is determined to have occurred if a ping-response packet to a ping-request packet is not received along the same route on which the request packet was transmitted within a periodic cycle; and
 a designation module to
 designate a failed media controller in response to determining that route failures for all of the plurality of routes have occurred within the number of consecutive periodic cycles, and
 designate a failed fabric device in response to determining that route failures for less than all of the plurality of routes have occurred within the number of consecutive periodic cycles.

10. The redundancy controller of claim 9, wherein to designate a failed media controller, the designation module is to:
 enter a degraded mode, wherein the degraded mode allows continued access to data previously stored on the failed media controller through use of redundant data stored on other media controllers.

11. The redundancy controller of claim 9, wherein to designate a failed fabric device, the designation module is to:
 transmit request ping-packets along the remaining routes that are functional; and
 monitor for route failures in the remaining functional routes.

12. The redundancy controller of claim 11, wherein to monitor for route failures in the remaining functional routes, designation module is to:
 shut down the redundancy controller in response to a determination from the monitoring that route failures in the remaining functional routes have occurred during a periodic cycle subsequent to the number of consecutive periodic cycles; and
 reenable the use of routes through fabric devices that are dependent upon the redundancy controller after the memory fabric is repaired.

13. A non-transitory computer readable medium to determine a failed component in a fault-tolerant memory fabric, including machine readable instructions executable by a processor to:
 transmit request packets along a plurality of routes between a redundancy controller and a media controller in periodic cycles;
 determine whether route failures for all of the plurality of routes have occurred within a number of consecutive periodic cycles, wherein a route failure is determined to have occurred if a response packet to a request packet is not received along the same route on which the request packet was transmitted within a periodic cycle;
 in response to determining that route failures for all of the plurality of routes have occurred within the number of consecutive periodic cycles,
 establish that the media controller has failed, and
 activate a degraded mode;
 in response to determining that route failures for less than all of the plurality of routes have occurred within the number of consecutive periodic cycles,
 establish that a fabric device has failed, and
 monitor for route failures in remaining functional routes.

14. The non-transitory computer readable medium of claim 13, wherein to monitor for route failures in the remaining functional routes, the machine readable instructions are executable by the processor to:
 shut down the redundancy controller in response to a determination from the monitoring that route failures in the remaining functional routes have occurred during a periodic cycle subsequent to the number of consecutive periodic cycles.

15. The non-transitory computer readable medium of claim 13, wherein in response the redundancy controller activating the degraded mode, the machine readable instructions are executable by the processor to prevent silent data corruption in the fault-tolerant memory.

* * * * *